(12) United States Patent
Sikangwan et al.

(10) Patent No.: US 11,810,539 B2
(45) Date of Patent: Nov. 7, 2023

(54) PERFORMANCE IMPROVEMENT WITH THE DAMONN MUSIC NOTATION SYSTEM

(71) Applicants: Dan Pirasak Sikangwan, San Diego, CA (US); Krisna Sikangwan, San Diego, CA (US)

(72) Inventors: Dan Pirasak Sikangwan, San Diego, CA (US); Krisna Sikangwan, San Diego, CA (US)

( * ) Notice: Subject to any disclaimer, the term of this patent is extended or adjusted under 35 U.S.C. 154(b) by 0 days.

(21) Appl. No.: 17/480,453

(22) Filed: Sep. 21, 2021

(65) Prior Publication Data

US 2023/0089269 A1 Mar. 23, 2023

(51) Int. Cl.
G09B 15/02 (2006.01)
G10G 1/04 (2006.01)

(52) U.S. Cl.
CPC ............. G10G 1/04 (2013.01); G09B 15/023 (2013.01); G09B 15/026 (2013.01)

(58) Field of Classification Search
CPC ....... G10G 1/04; G09B 15/023; G09B 15/026
See application file for complete search history.

(56) References Cited

U.S. PATENT DOCUMENTS

| | | |
|---|---|---|
| 49,987 A | 9/1865 | Durall |
| 66,239 A | 7/1867 | Hurd |
| 141,849 A | 8/1873 | Blauvelt |
| 182,226 A | 9/1876 | Randolph |
| 211,722 A * | 1/1879 | Engers .................. G09B 15/026 84/473 |
| 236,443 A | 1/1881 | Linthicum |
| 243,506 A | 6/1881 | Carson |
| 304,328 A | 9/1884 | Isham |
| 360,339 A | 3/1887 | Cooke |
| 608,771 A * | 8/1898 | Guilford .............. G09B 15/026 84/471 R |
| 773,681 A * | 11/1904 | Schmidt .............. G09B 15/026 84/473 |
| 3,741,066 A | 6/1973 | Cromleigh |
| 5,574,238 A | 11/1996 | Mencher |
| 5,962,800 A | 10/1999 | Johnson |
| 6,313,387 B1 | 11/2001 | Yamauchi |
| 6,388,182 B1 * | 5/2002 | Bermudez ........... G09B 15/026 84/478 |
| 6,476,303 B1 * | 11/2002 | Mutou ................. G09B 15/026 84/483.1 |
| 7,241,945 B1 * | 7/2007 | Egan ..................... G09B 15/00 84/471 R |
| 7,261,295 B2 * | 8/2007 | Grant ....................... A63F 3/00 273/459 |
| 7,439,438 B2 | 10/2008 | Hao |
| 8,039,721 B2 | 10/2011 | Wold |

(Continued)

OTHER PUBLICATIONS

Stuart Byrom, 'WYSIWYP—A Simplified Notation for Sheet Music'. Music Notation Modernization Association ('MNMA'). dated: Apr. 11, 2019 USA.

*Primary Examiner* — Robert W Horn

(57) ABSTRACT

The DAMONN music notation system creates a simple alphanumericals on the music staves for ease of reading, writing, teaching and learning music. The system, methods and teaching aids of the DAMONN music notation system had been adapted for all musical instruments in the family categories of keyboard, string, brass and woodwind, and percussion instruments.

9 Claims, 15 Drawing Sheets

(56) References Cited

U.S. PATENT DOCUMENTS

| | | | |
|---|---|---|---|
| 8,686,268 B1 | 4/2014 | Young | |
| 8,907,195 B1* | 12/2014 | Erol | G10H 1/361 |
| | | | 84/649 |
| 9,196,171 B2* | 11/2015 | Nguyen | G09B 15/026 |
| 9,224,373 B2 | 12/2015 | Vandendool | |
| 9,406,241 B2* | 8/2016 | Cosgrove | G09B 15/001 |
| 9,947,301 B2* | 4/2018 | Kelsey | G10G 1/04 |
| 9,959,778 B2* | 5/2018 | Sangeet | G09B 15/04 |
| 10,013,961 B1* | 7/2018 | Campbell | G10G 1/02 |
| 10,354,625 B2* | 7/2019 | Wei | G10G 1/02 |
| 10,515,614 B2* | 12/2019 | Zhou | G09B 15/026 |
| 10,593,229 B2* | 3/2020 | McCarthy | G09B 15/08 |
| 11,127,383 B1* | 9/2021 | Zhou | G09B 15/026 |
| 2002/0134216 A1* | 9/2002 | Shibukawa | G09B 15/026 |
| | | | 84/478 |
| 2010/0186575 A1* | 7/2010 | Rosen | G09B 15/023 |
| | | | 84/483.1 |
| 2023/0089269 A1* | 3/2023 | Sikangwan | G10G 1/04 |
| | | | 84/483.2 |
| 2023/0099808 A1* | 3/2023 | Novoa | G10H 1/0008 |
| | | | 84/453 |

* cited by examiner

PERFORMANCE IMPROVEMENT WITH THE DAMONN MUSIC NOTATION SYSTEM

FIELD OF THE INVENTION

The present invention relates generally to music, music notation system, music teaching methods, a system and a method for reading and writing to play musical instruments, instrument teaching aids, and learning method to play a musical piece on the musical instrument.

BACKGROUND OF THE INVENTION

Be it known that two inventors, Dan Pirasak SIKANG-WAN, a citizen of the United States of America, and a resident of San Diego, Calif., USA, and Krisna SIKANG-WAN, a citizen of the United States of America, and a resident of San Diego, Calif., USA, have invented certain new and useful improvements in music notation, of which the following is a sufficiently full, clear, and exact description of the present invention whose the application number is U.S. Ser. No. 17/480,453 and the filing date was Sep. 21, 2021.

The said inventors, my wife and I, had tried to read music and play an 88-key electronic keyboard over several years. Learning the traditional sheet music was time-consuming, we felt discouraged from our slow progress and eventually gave up. I had already learned to play the guitar using the Tablature sheet music when I was young but still had a hard time picking up a new instrument using the traditional sheet music. After my retirement in 2018, we bought another electronic keyboard because we really wanted to play piano songs. In an attempt to simplify the learning of the musical notation, I placed stickers on the keys with octave numbers from 0 to 8 in order to differentiate the octave. I noticed the similarities of the 12-note pattern on the guitar string and the 12-note pattern of each octave on the piano keyboard. I then transformed the traditional sheet music into octave numbers and music notes of C, C #, D, D #, E, F, F #, G, G #, A, A #, B to match the piano keys. Then, I placed stickers of music notes on the keys as well.

I drastically see a difference in learning the electronic keyboard after creating this new musical notation system. We can quickly play a new song without having to memorize the traditional musical notation with music symbols. We realize that we don't have to spend years to develop the skills to read sheet music quickly. The new musical notation system enhances the learning experience because not only can I read the music notes quicker but also the learning becomes more intuitive.

This new method of invention will help improving the first impressive experience of a music beginner as well as an experienced musician by eliminating or minimizing the translation process of traditional music notation that has been in use for several hundred years or more. This invention of a new music notation system, specifically referred to as the 'DAMONN music notation' system 84 as shown in FIG. 5B, will be more of a natural processing system that requires minimum memorization and will also enhance the positive encouragement to learn the music reading for any musical instrument without boredom. Therefore, this first kind of memorization can be improved tremendously by the new music notation and that is the main purpose of this invention.

The second kind of memorization is for playing correct keys of the piano within a short and limited time duration and to match with the tempo 109 of the song. In the example of a piano, or any other instrument, this is a correlation task between brain memory and muscle memory that require repetitive practice through months and years by musicians or players. This practice is a natural development process for a musician as same as other professional practice in comparison. And, this new music notation invention will have a minor positive effect to the improvement of the second kind of memorization.

BRIEF SUMMARY OF THE INVENTION

This invention comprises methods, system, and devices for reading and writing a simplified and more efficient music notation system referred to as the 'DAMONN music notation' system, as shown in FIG. 4A and FIG. 5B. This system can be used in the family categories of keyboard, string, brass, woodwind, and percussion musical instruments.

The present invention consists of a 'Treble staff' or 'Treble Musical-Note area' 21 and a 'Bass staff' or 'Bass Musical-Note area' 22 which are different from the Treble clef 11 and Bass Clef 13 of the traditional (or standard) notation. The Treble staff may consist of two or more of staff-spaces or called 'octave-spaces'. Similarly, the Bass staff may consist of two or more of staff-spaces. A staff-space is created between two staff-lines. The music notes are written on only staff-spaces of the DAMONN music notation system. However, these staff-lines are not used to hold music notes and have no significant meaning in our present DAMONN notation system. The music notes on the present musical notation system will provide readily correlated with the actual position of any certain musical instruments, i.e., piano keyboard, to permit a musician to visually-and-directly read written music.

The present music notes may be created by using alphabets, numbers, and special signs. However, the enormous difference between the traditional methods and our new present method is that the DAMONN music notation system can be easily learned to read and write with minimum memorization of the instrument players for both beginners or experienced musicians. This simplicity provides the music creativity window that has never been offered before. Because of the simplicity of the DAMONN notation, a child or an adult beginner will be able to read music notes directly from DAMONN notation correctly from the very beginning of music lessons. Parents will find that the DAMONN notation system is easy to learn by themselves with effortless such that they will be able to explain it to their children. And, their children will understand it quickly especially with less difficulty to learn complex sheet music on their own.

Another direct benefit to people is the simplicity to translate any existing written music in traditional sheet music into DAMONN music notes on the new music sheet with the DAMONN music notation system. With the aid of the music chart of FIG. 8A of the DAMONN system, intermediate players can translate written music from the traditional (standard) sheet music into the DAMONN sheet music by hand personally and directly. In addition, with the technological advances in computer, the DAMONN system can be developed into software packages or into electronic devices that can help increasing the speed of music note translation (or transformation) from the traditional system into the DAMONN notation system with ease. Children who begin learning at an early age will have fully matured with the musical instrument within a few years which will lead to better musicians. This development leads to a better standard practice of music and innovation in music because of the freedom to expand their imagination and providing more practice time of their musical instruments. Thanks to the elimination of the process of graphical symbol memorization from learning music notes.

DETAILED DESCRIPTION OF THE INVENTION

Figure 1A:
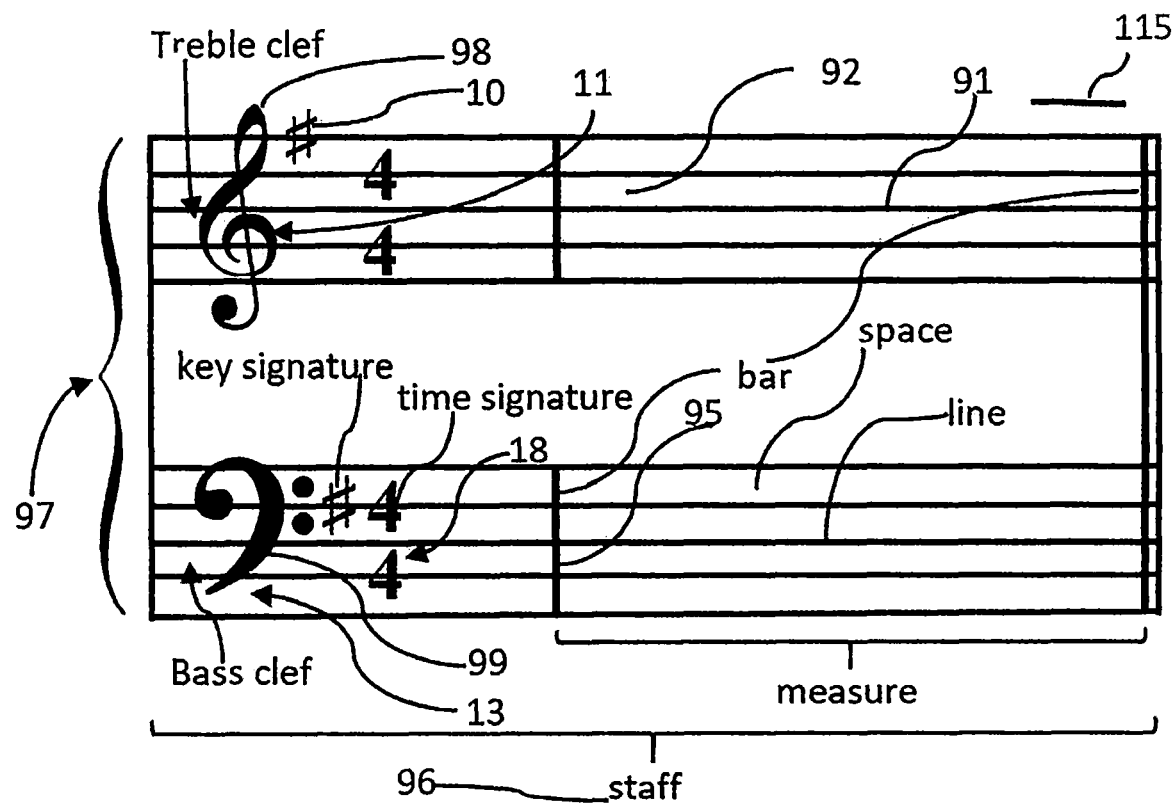
FIG. 1A shows a prior art of the grand staff and its components, using the traditional (standard) music notation system
Figure 1B:
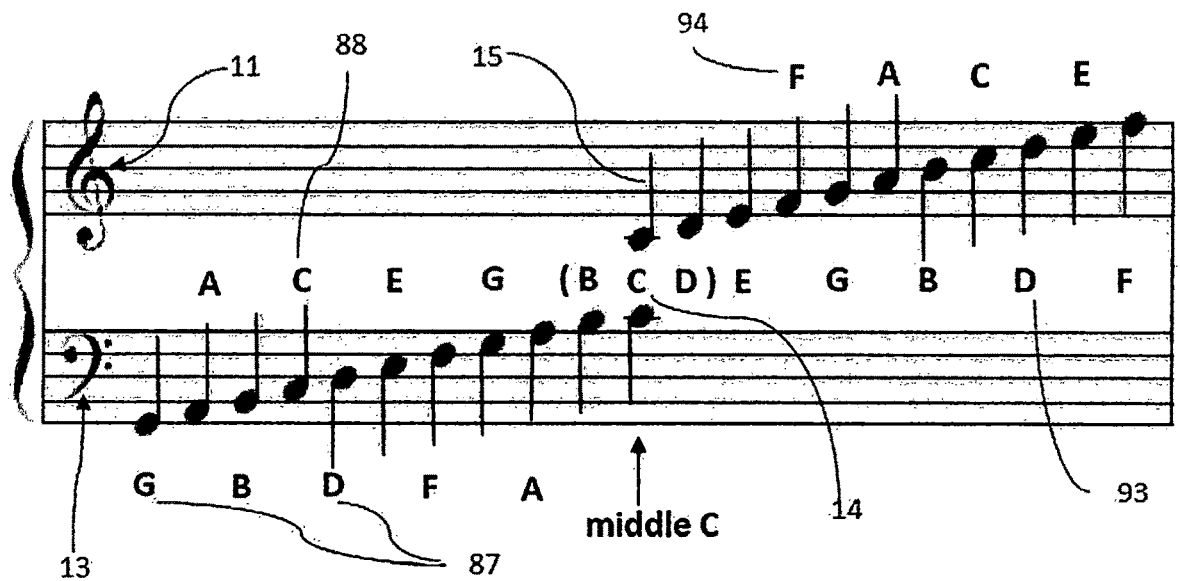
FIG. 1B shows music note symbols and note names within five staff lines of Treble clef and Bass clef using the traditional music notation system
Figure 1C:
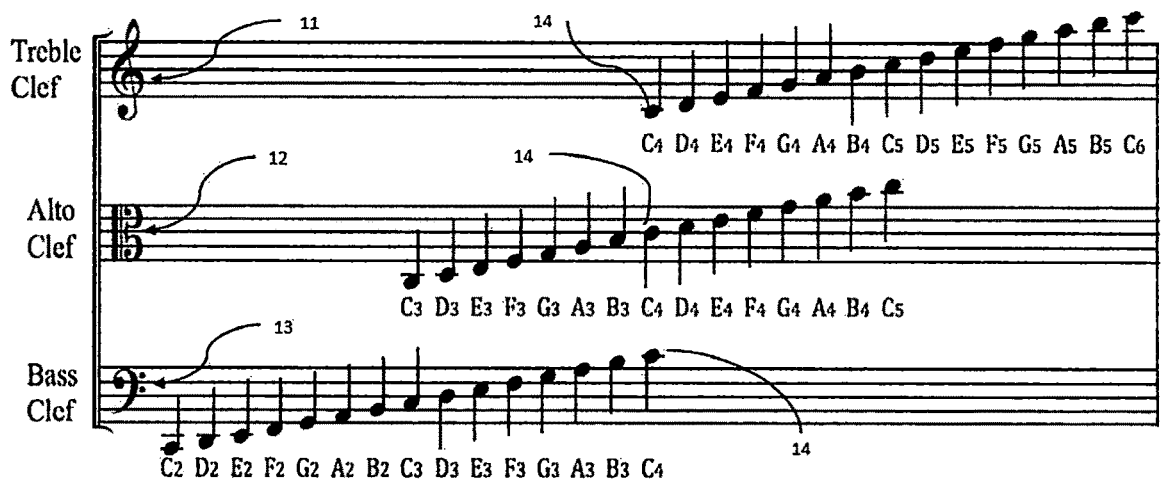
FIG. 1C shows music note symbols and note names in two octaves for Treble clef, Alto clef, and Bass clef using the traditional music notation system

At present, the traditional (or standard) music notation utilizes a staff 96 or combinations of staves 97, with a fundamental structure of five lines 91 and four spaces 92, arranged in a horizontal manner. FIG. 1A shows a traditional Grand staff which consists of two staves, treble clef and bass clef. The treble clef contains higher musical notes which have higher pitch than the middle C 14. And, the bass clef contains lower musical notes which have lower pitch than the middle C, as shown in FIG. 1B and FIG. 1C. In the traditional notation, a music note is a graphical symbol denoting a musical sound.

Figures 2A, 2C:
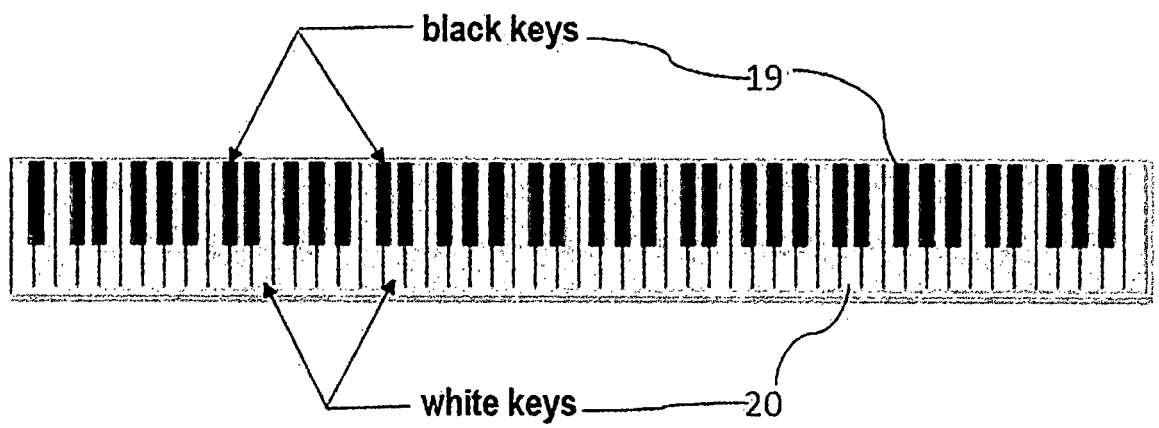
FIG. 2A shows the traditional 88-key piano and electronic keyboard arrangement
FIG. 2C shows different kinds of music note symbols, rests, and their features of the traditional music notation system
Figure 2B:
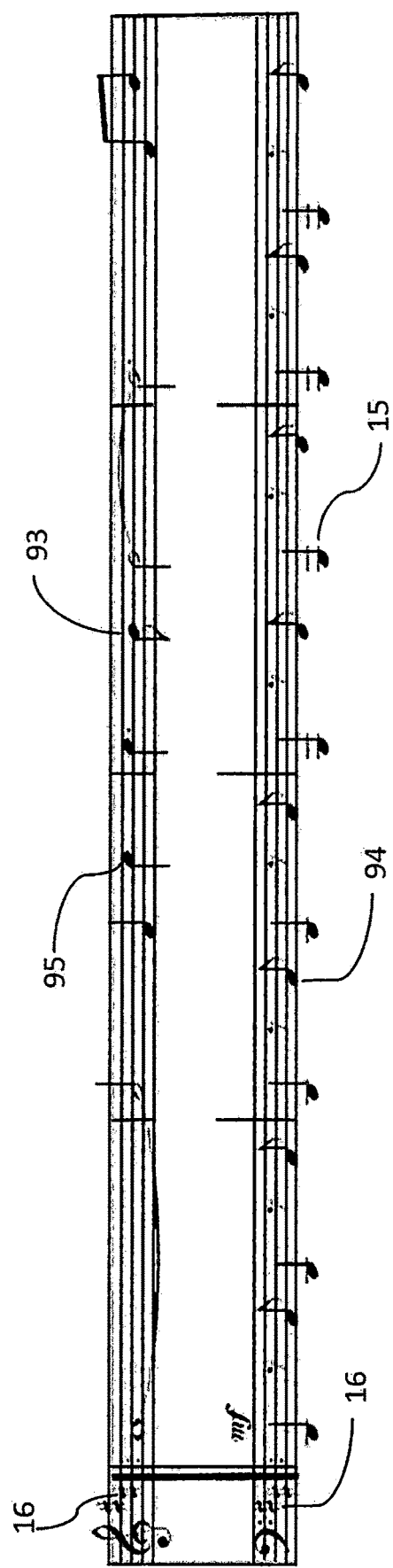
FIG. 2B shows an example of four measures of the traditional sheet music consisting of Treble clef and Bass clef with music note symbols

FIG. 2B shows rhythm and sound duration which are some elements of traditional music notation. In FIG. 2C, the whole note 101, shown as a white oval, has time value of 4 beats. The half note 102, shown as a white oval with a stem, has time value of 2 beats. The quarter note 103, shown as a black oval with a stem, has time value of 1 beat. The eighth note 104, shown as a black oval with a stem and a flag, has time value of ½ beat. The sixteenth note 105, shown as a black oval with a stem and two flags, has time value of ¼ beat. Other similar elements, such as thirty-second note, sixty-fourth note, rests, and etc., have similar sound duration as shown in FIG. 2C.

FIG. 2A shows a full range of the traditional music system which has 88 music notes, played on a traditional 88-key piano or electronic keyboard, with black keys 19 and white keys 20. These 88-keys create 88 different pitches or sounds. The complexity of these music symbols depends on their locations; some music symbols are on one or more of 4 spaces of Treble clef, and some music symbols are on one or more of 4 spaces of Bass clef; some symbols are on one or more of 5 lines of Treble clef, and some symbols are on one or more of 5 lines of Bass clef; one or more symbols are above the Treble clef; one or more symbols are below the Bass clef; and/or one or more symbols are in between the Bass clef 13 and Treble clef 11.

In addition to the 5 lines of Treble clef 11, there are 9 additional invisible lines which are called ledger lines. Ledger lines are above the Treble clef and are used for much higher pitches. For examples, the music note C6 has 2 ledger lines (shown by two short lines at the stem of this music symbol), the music note C7 15 has 5 ledger lines (shown by five short lines at the stem of this music symbol), and the music note C8 has 9 ledger lines (shown by nine short lines at the stem of this music symbol).

Similarly, there are 9 additional invisible ledger lines below the Bass clef 13 which are used for much lower pitches. For examples, the music note C2 has 2 ledger lines (shown by two short lines at the stem of this music symbol), the music note C1 has 5 ledger lines (shown by five short lines at the stem of this music symbol) and the music note C0 15 has 9 ledger lines (shown by nine short lines at the stem of this music symbol).

The problems which arise in the traditional system of illustrating music, as shown in FIG. 2B, are almost too numerous to mention. The system of using sharps 16 and flats at the beginning of each staff, as known as the Key Signature 10, can only positively identify the major scales (Keys) of a song to the musician. Other intended scales such as minor (or natural minor), melodic minor, harmonic minor, jazz, blues, the various modes (e.g. Phrygian, Lydian) are not obviously understood to most musicians.

Determining the correct music note to play can be more complicated when including Key Signature (the sharps and flats) because the music note must be determined first and then raised or lowered by one semi-tone. The sharps or flats at the beginning of the staff are shown only once whereas the note alteration is done for all of the same notes regardless of where they appear on the staff. For instance, a G-sharp symbol is shown only on the fourth line at the beginning of the staff but the sharp must be applied to any G note, regardless of the number of extension lines above or below that staff. This feature of Key Signature requires additional mental memory of a professional musician, including a child musician, and a beginning adult musician, during the performance.

As shown in FIG. 2B, a musician must be able to sight read all notes regardless of position (i.e. octave 17) as well as remember which Key Signature 10 is selected and remember to add the sharps or flats to the music note before playing it. The traditional system is adequate for the C major scale (seven tones with neither sharps nor flats), or the chromatic scale C (the twelve semi-tones of an octave). The traditional system is difficult to learn for any scale other than the chromatic scale C or the C-major scale. These are some of the existing problems of the traditional music notation system.

It is apparent that reading the seven music notes in a diatonic scale and a non-repetitive notation scheme, with additional five notes with sharp or flat notation, while readable by musicians but the speed may be slower than the required speed by the Time Signature 18 of the sheet music. In general cases for most players, that is the truth of actual experiences especially for the first-time reading of any particular sheet music.

Figure 3:
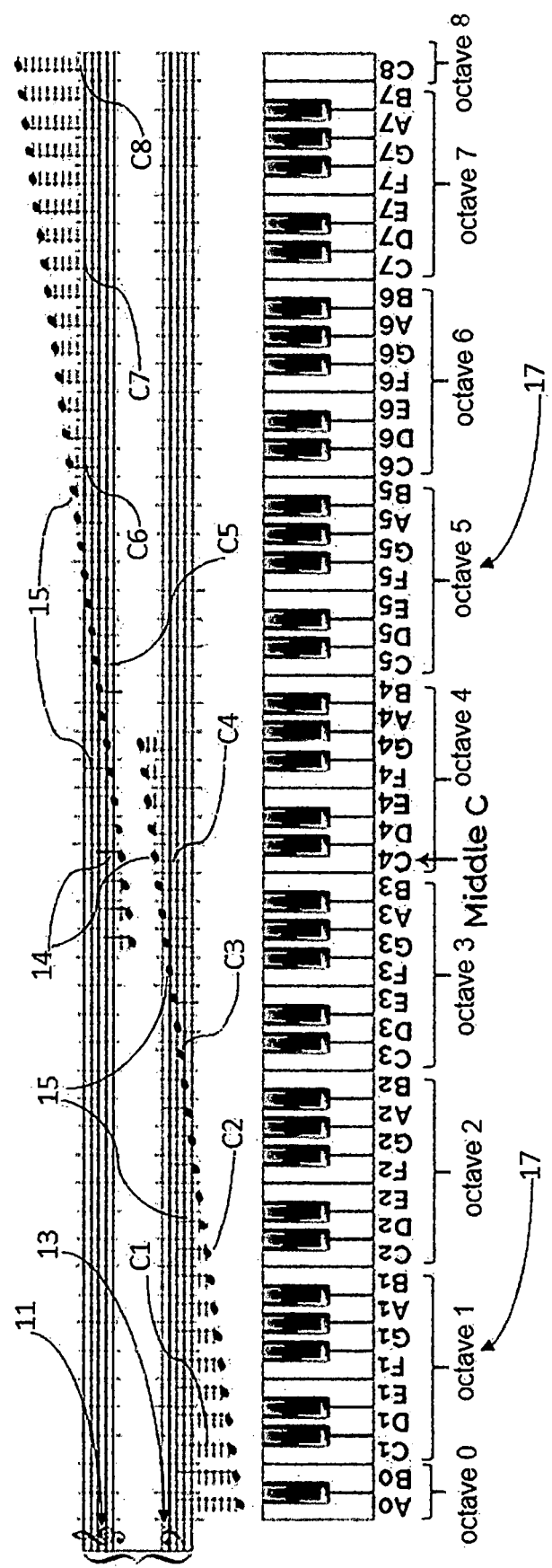
FIG. 3 shows the correlation between 52 white keys of piano and the traditional music note symbols, note names, and relating octaves

In overall view of traditional notation problem, we can see clearly from FIG. 2B that the traditional notation system is too complicated and too complex beyond necessity. In order to read or write sheet music for 88-key piano or keyboard, the traditional music notation uses a system consisting of the 52 white keys that are assigned to 52 graphical symbols written on 5 lines and 4 spaces of Treble clef, and on 5 lines and 4 spaces of Bass clef, including written on 9 lines and 8 spaces of the ledger lines above the Treble clef, and on 9 lines and 8 spaces of the ledger lines below the Bass clef. In addition, the 36 black keys are assigned a sharp symbol (#) to increase a semitone higher than those corresponding and adjacent 36 music notes of white keys. To make it more difficult, the 36 black keys may be assigned a flat symbol to decrease a semitone lower than those corresponding and adjacent 36 music notes of white keys shown on the staff. We can see clearly when we study the correlation between 88 keys of piano keyboard with the 88 graphical symbols on Treble clef and Bass clef as shown in FIG. 3 for comparison of each music note and corresponding music symbol.

For the past four hundred years or more, all musical instruments available today pivot around the audio spectrum of the 88 keys on a classical piano, as shown in FIG. 2A. Using a modern piano as an example shown in FIG. 2B, for a slow-tempo sheet music where a beat duration is 60 beats per minute (bpm), on each beat or each second of time duration, a musician has to translate several notes of the written music to identify particular actuators of a musical instrument, i.e., several keys of a piano in black keys 19 or white keys 20, which are to be manually, mechanically or electronically operated.

Generally, it is not simple for an experienced musician to translate five or six notes in each second for a full 88-key piano or electronic keyboard. This is a full concentration task to read six notes which are to be translated into his (her) memory to which six keys on a keyboard must be played in each second. Even for an experienced musician, he (she) will need more time than one second for note translation, for identification of keys of a piano, and for playing correct keys of the piano. The experienced musician will have to practice that sheet music several times earlier so that he (she) can memorize how to play that particular sheet music in a way of learning-by-heart or playing without looking at that sheet music. After practicing that sheet music for thirty times or more, the experienced musician will be able to play the sheet music in time specified by its specific Time Signature 18 and Time Duration. The traditional music notation has been used in this musical practice, that 'Every player has to memorize the whole sheet music', which is considered to be inefficient and time-consuming method for more than three hundred years but there has been no other better alternative in existence. In general cases or in most cases, reading a traditional sheet music will require a lot of memorization of the musician.

Music teachers will often stress how important it is to use memorization by saying some familiar sentences like, "It is good to learn how to read ahead of what you are currently playing, or else it can be difficult to comprehend the information in time and you will stumble. Use mnemonics to help you remember the order of the notes". In addition, experienced sheet music readers would also need to learn the skill of reading something while playing something else. But the personal problem of every player is that memorization and music playing ability would take years for any beginner to become an experienced sheet-music reader.

Reading notes ahead in sheet music is required for sight-reading, it involves processing the notes and the rhythm and using the working memory. To read two lines of music at the same time, one needs to develop strong aural skill and mental skill in order to remember what was played and whether it was correct as well as the skill to look ahead and retain the information. Therefore, in order to become a fluent sight-reader, one must train to improve the note-recognition, aural skills and working memory. In summary, the traditional music notation is complex and has a steep learning curve, while the DAMONN music notation was invented to simplify the music notation and the learning.

With this invention of the DAMONN music notation, people will have a better choice to change the way that they read music and play musical instruments. The methods in prior art still carry many disadvantages that are still too complex for children, teenagers, adults, and the elderly alike to comprehend when reading a sheet music and playing a musical instrument.

Figure 4A:
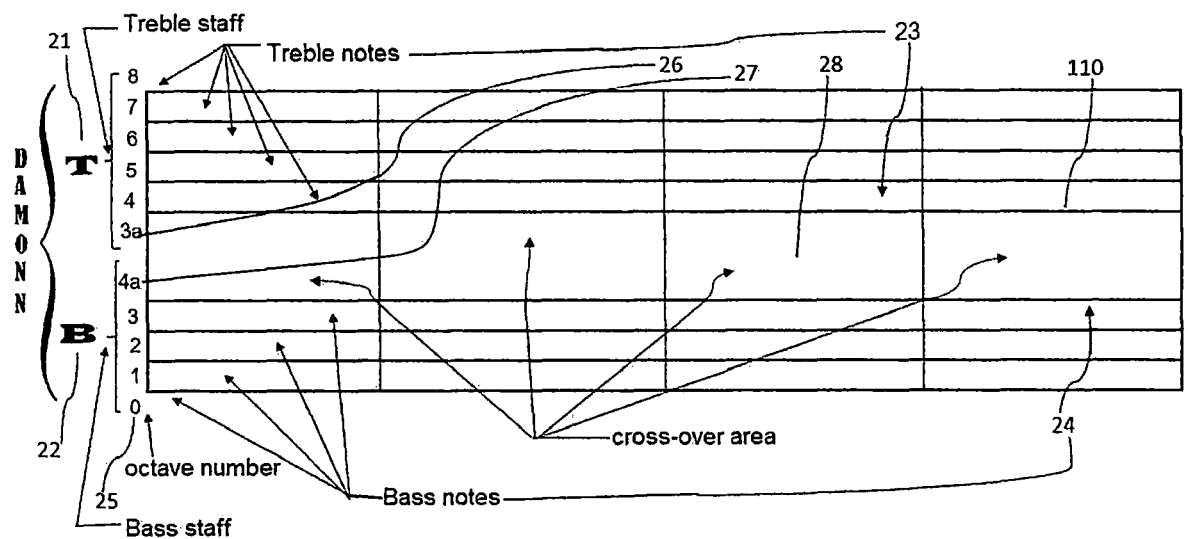
FIG. 4A shows the present Treble staff and Bass staff of the DAMONN Music Notation System with their components
Figure 4B:
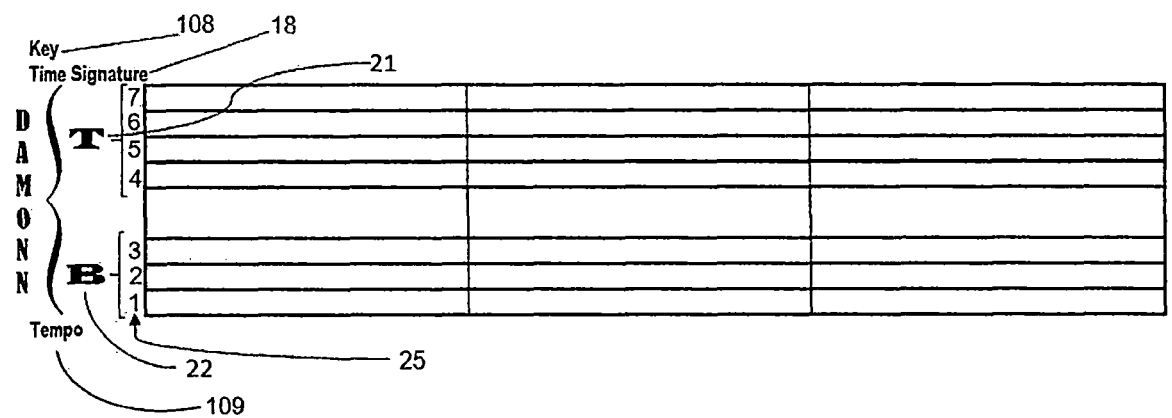
FIG. 4B shows key, time signature, and tempo of the present Treble staff and Bass staff of the DAMONN Music Notation System

FIG. 4A shows the Grand staff of the DAMONN Music Notation System which consists of Treble staff 21 and Bass staff 22. In the Treble staff, there are 4 spaces for higher pitch notes from full octave 4, starting with the middle C4, to full octave 7 and including the highest pitch note of C8 of octave 8. These music notes will be written on the staff-spaces 23 only and not on the staff-lines as in the traditional music notation. Therefore, the 4 staff-spaces 23 are assigned for octaves 4, 5, 6, and 7 from the bottom to the top of the Treble staff 21. Reading the music notes is much easier in this case since there is less detail on the sheet music. Generally, the staff-space for octave 8 is above octave 7 although it is not typically shown on this music sheet; and, the note C8 of octave 8 can be written above the top line of Treble staff. The octave numbers will be shown as 4, 5, 6, and 7 in FIG. 4B with an empty music sheet of the DAMONN music notation.

From FIG. 4A, in the Bass staff 22, there are three staff-spaces for lower pitch notes starting with the note C1 of octave 1, to notes B3 of octave 3. These music notes will be written on the staff-spaces 24 only. Therefore, the three staff-spaces are assigned for octaves 1, 2, and 3 from the bottom to the top of the Bass staff. In addition, the Bass staff also includes three music notes from the lowest pitch notes of A0 to notes A #0 and B0 of octave 0. Generally, the staff-space for octave 0 is below the octave 1 although it is not typically shown on this music sheet; and, the music notes A0, A #0, and B0 of octave 0 can be written below the bottom staff-line of Bass staff; and on the staff-space of octave 0, the note A, A #, and B of octave 0 can be written below the bottom line of the Bass staff. The octave numbers will be shown as 1, 2, and 3 in FIG. 4B with an empty music sheet of the DAMONN music notation.

As shown in FIG. 4A, this DAMONN sheet music introduces the use of the cross-over area 110 for the case where there are many music notes in octave 3 and octave 4. We will consider this case separately: one case for Treble staff and another case for Bass staff. In the Treble staff, the music composer has the option to add another optional staff-space, which will be referred to as 'octave space' 27, in the cross-over area 110 for decoupling music notes from the octave 4 on Treble staff and placing some of those music notes into this additional octave space. This additional octave space can be used for the second octave 4 by labeling 4a or the number 4 in a square bracket. Another use of additional octave space for octave 3 26, labeled 3a or by the number 3 in a square bracket. The square bracket indicates the additional octave space which is used to hold some music notes to be played by the right hand.

Similarly, for the Bass staff, the music composer has the option to add another optional octave space 27 in the cross-over area 110 for decoupling music notes from octave 3 on Bass staff and placing some of those decoupling music notes into this additional octave space. This additional octave space can be used for the second octave 3 by labeling 3a or the number 3 in a square bracket. Another use of additional octave space would be for the second octave 4 27 by labeling 4a or the number 4 in a square bracket. The square bracket indicates the additional octave space which is used to hold some music notes to be played by left hand.

Figure 5A:
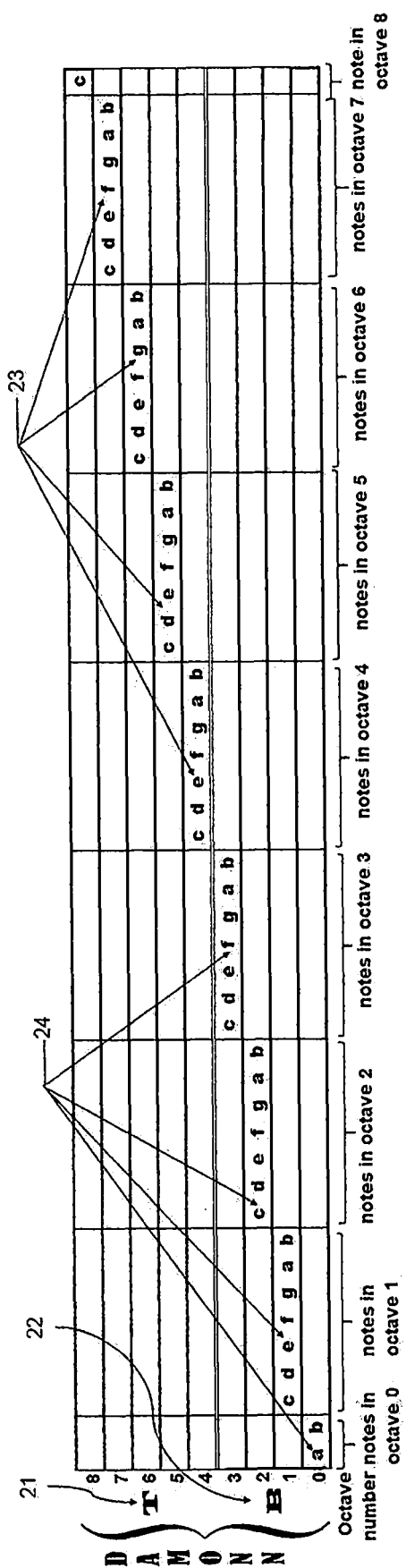
FIG. 5A shows the present music notes and their corresponding octaves in the present Treble staff and Bass staff of the DAMONN Music Notation System
Figure 5B:
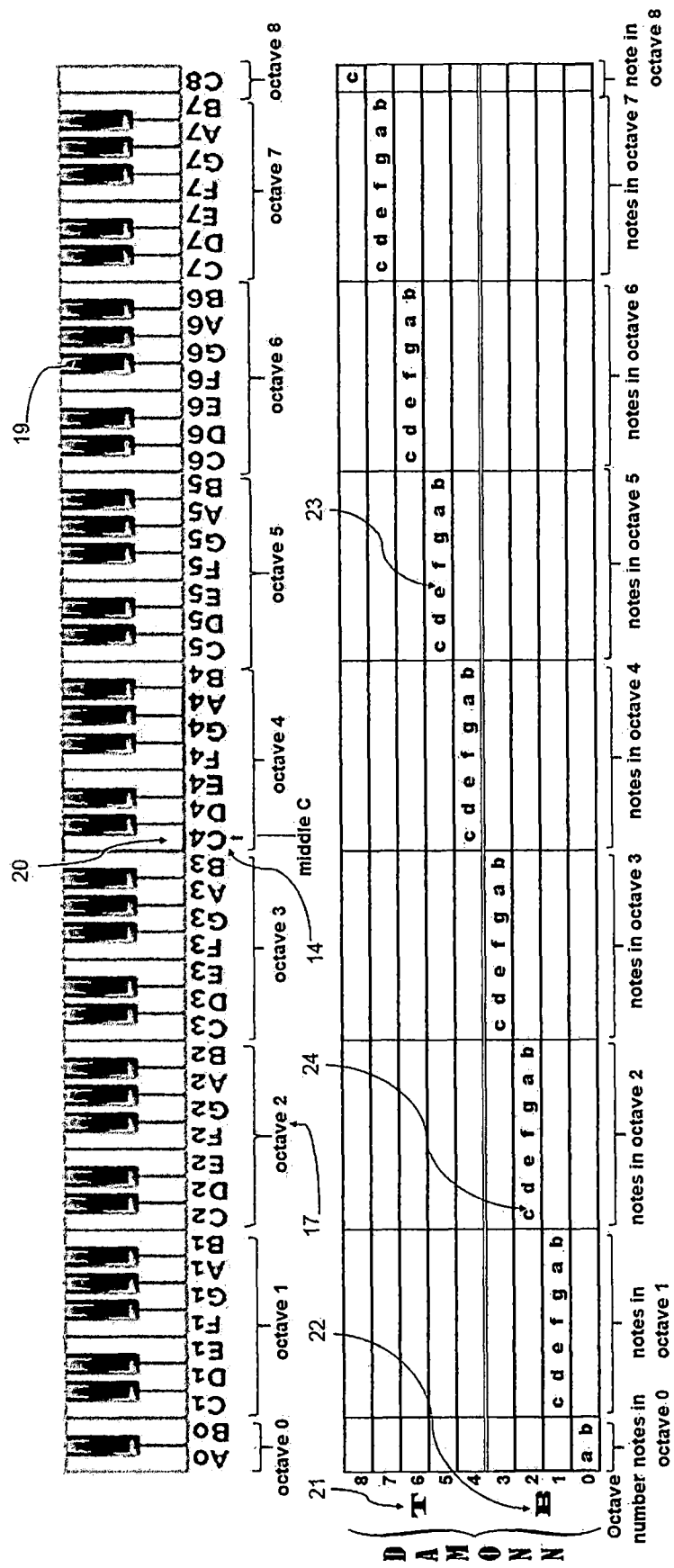
FIG. 5B shows the direct correlation between the present DAMONN music notes and the white keys of piano keyboard
Figure 5C:
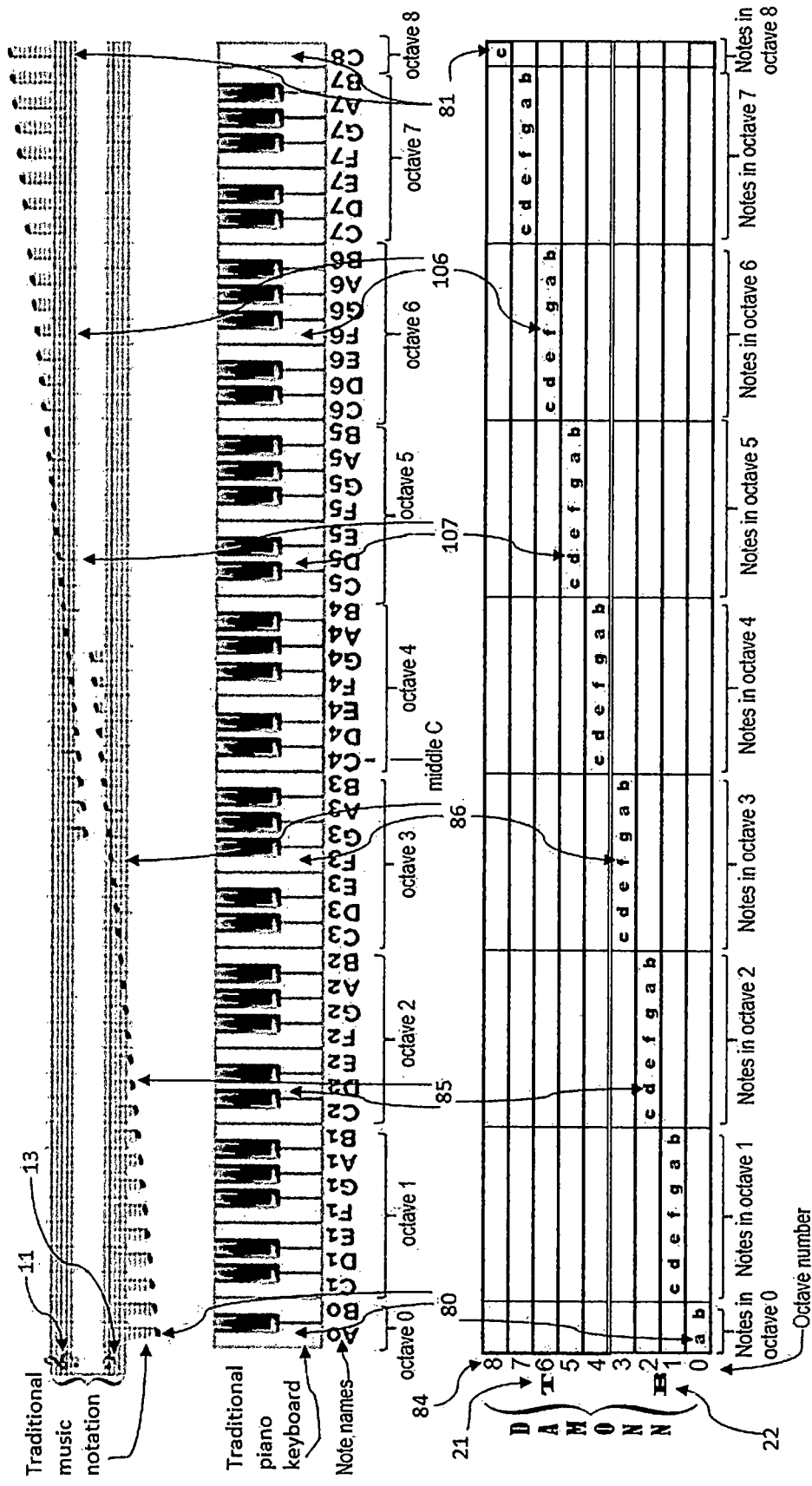
FIG. 5C shows the direct correlation between the present DAMONN music notes, the white keys of piano keyboard, and the traditional note symbols

There are relationships between the three systems: the traditional music notation, the 52-white-key piano keyboard, and the DAMONN music notation for 52 white keys. FIG. 5A shows 52 music notes of the DAMONN music notation consists of nine octave spaces from octaves 0, 1, 2, 3, 4, 5, 6, 7, 8 with all 52 alphabetical music notes for 52 white keys of piano keyboard. FIG. 5B shows the DAMONN music notes corresponds to 52 white keys of piano keyboard. As shown in FIG. 5C, the three systems are superimposed and each piano key is aligned with a corresponding music note of the traditional music notation, and also the DAMONN music notation. This shows the relationships between the DAMONN music notation, the white keys of piano keyboard, and the traditional music notation.

Figure 6:
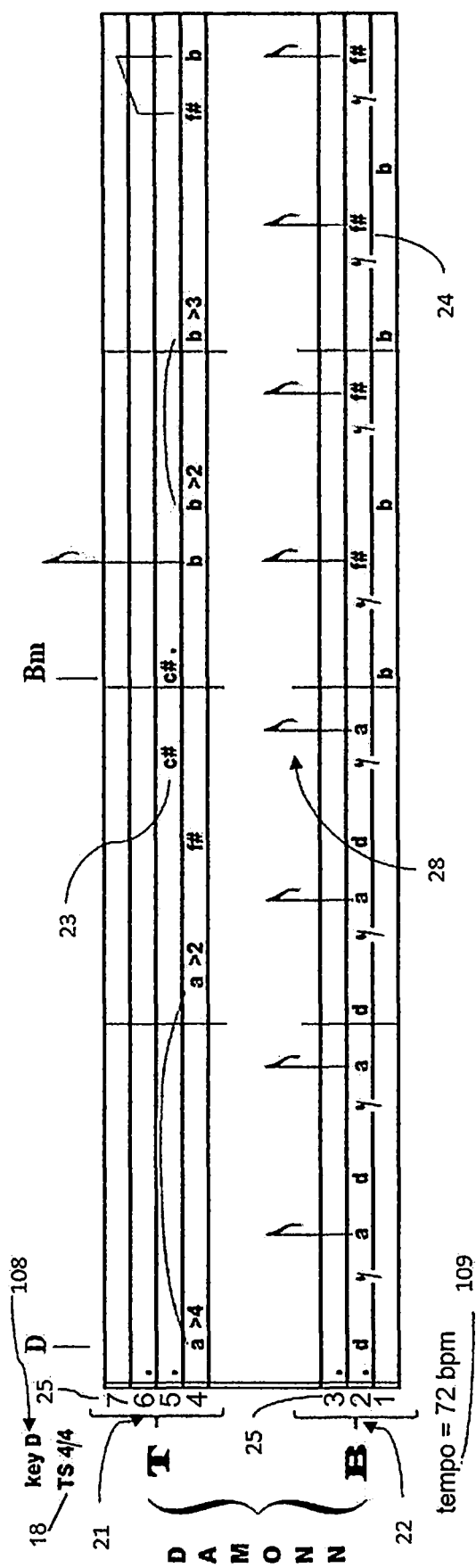
FIG. 6 shows the direct equivalent representation of the present DAMONN sheet music which is compared to the traditional sheet music in FIG. 2B

FIG. 6 shows the comparison between the DAMONN music notes with the names and their corresponding octaves and the traditional music notes of the song 'Love Theme' by 'Barry White and the Love Unlimited Orchestra'.

Figure 8A:
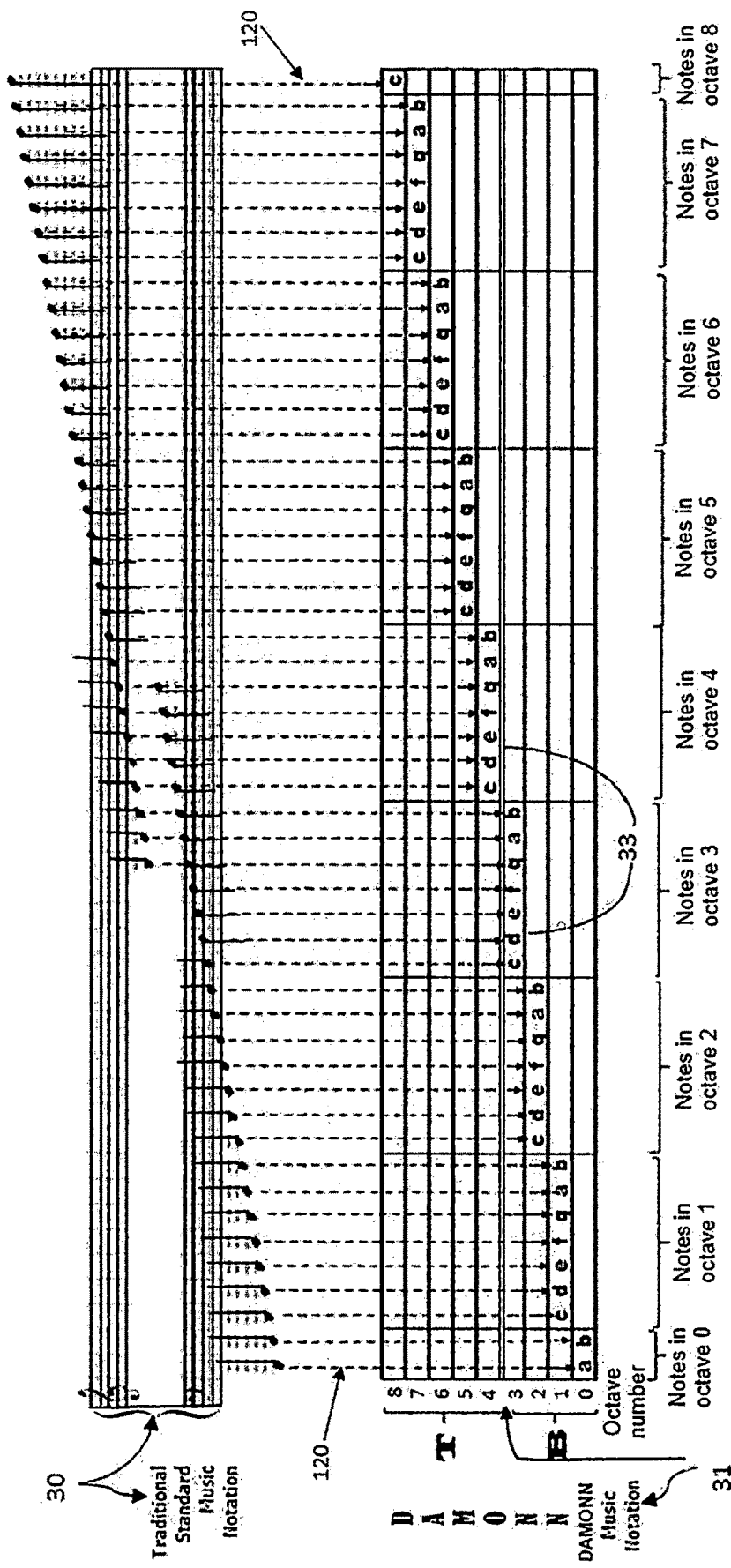
FIG. 8A shows the conversion chart of 52 white keys of the piano between traditional note symbols and the present DAMONN music notes

FIG. 8A shows the translation of the 52 music symbols from the traditional notation 30 to the DAMONN music notation 31. This translation chart can be used to translate a traditional sheet music to a DAMONN sheet music with ease. This translation method, referred to as 'Homophone Transformation', consists of transforming instructions of a set of music notes to the corresponding musical pitches. For instance, when reading the DAMONN music notation, the music note c2 (the music note c in the octave number 2 on the bass staff) is easily translated to the piano key C2 (the key C on the octave 2 of the piano).

Figure 8B:
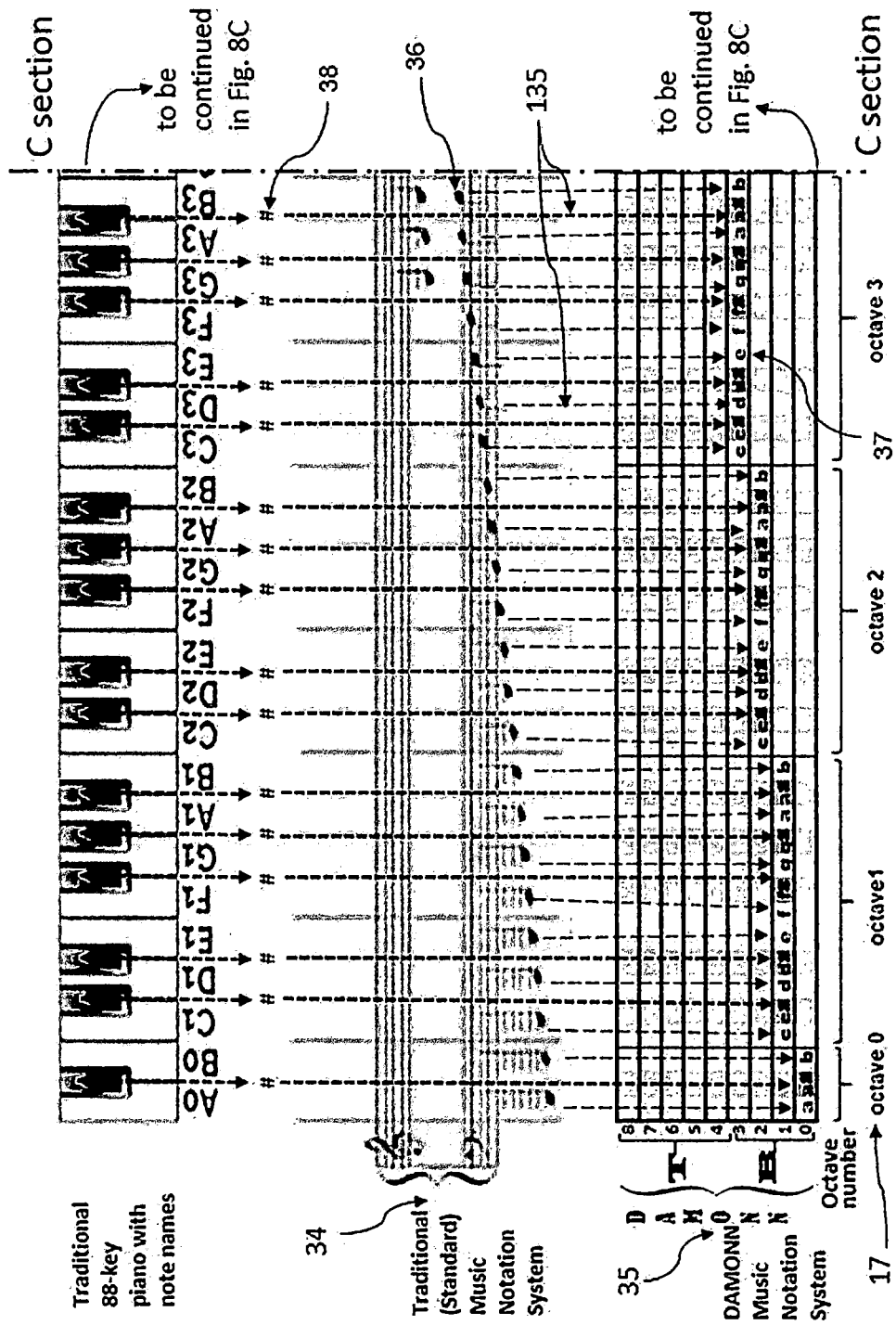
FIG. 8B shows the conversion chart of white and black keys within octaves 0, 1, 2, and 3 of piano between the traditional note symbols and the present DAMONN music notes
Figure 8C:
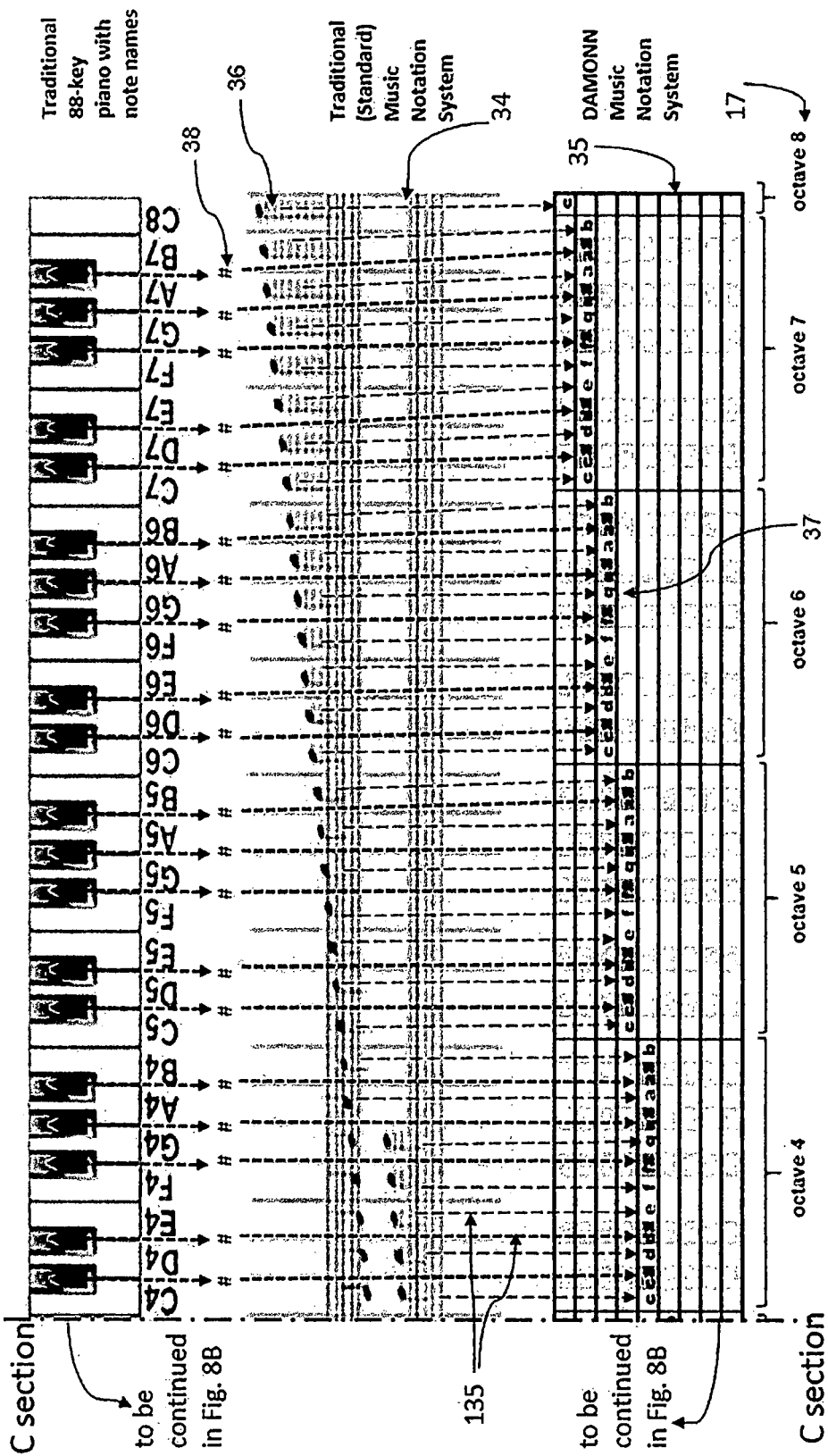
FIG. 8C shows the conversion chart of white and black keys in octaves 4, 5, 6, 7, and 8 of piano between the traditional note symbols and the present DAMONN music notes

FIG. 8B and FIG. 8C have the same content as FIG. 8A but with an additional information on the 36 black keys on a piano; a black key has an alphabetical note name with the sharp (#) sign. The 5 black keys (C #, D #, F #, G # and A #) are added into each octave where applicable in FIG. 8A, shown in gray columns between the white keys.

To further simplify the music notation, the DAMONN music notation uses the Key 108 of the music piece (song) rather than the Key Signature 10. It is strongly recommended that the Key Signature 10 will not be used because its disadvantages are more than the benefits in many folds. The objective of the DAMONN music notation is to eliminate extra symbols for sharps or flats at the beginning of any Treble clef 11 or Bass clef 13 of the traditional sheet music, and to provide a simplified Grand staff where each key of the keyboard is represented by an alphabetical note name and an octave number on a staff-space between staff-lines of the Grand staff of the DAMONN sheet music.

Figure 7A:
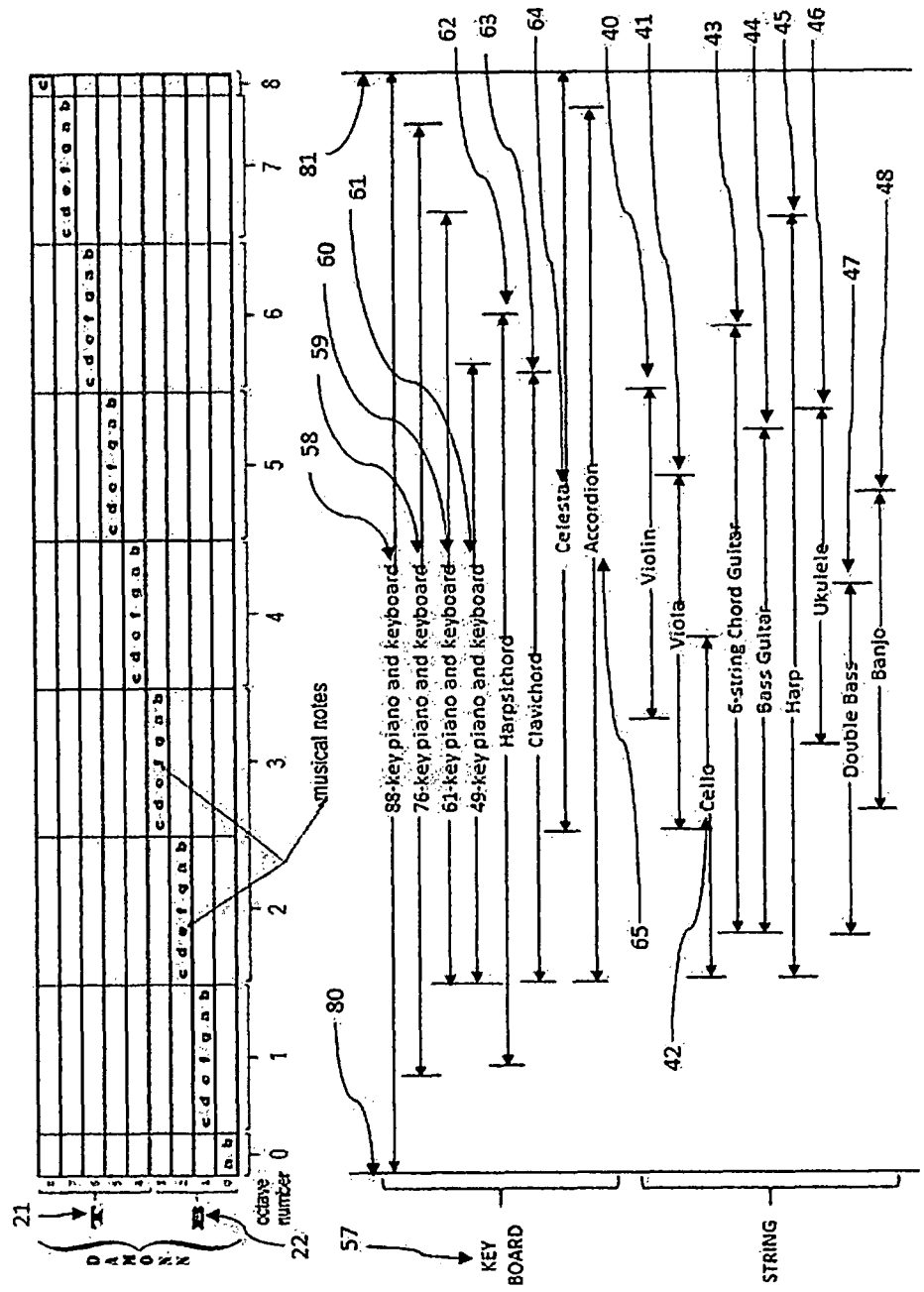
FIG. 7A shows the ranges of music notes of several musical instruments, in the family categories of keyboard and string that can be used with DAMONN music notation system
Figure 7B:
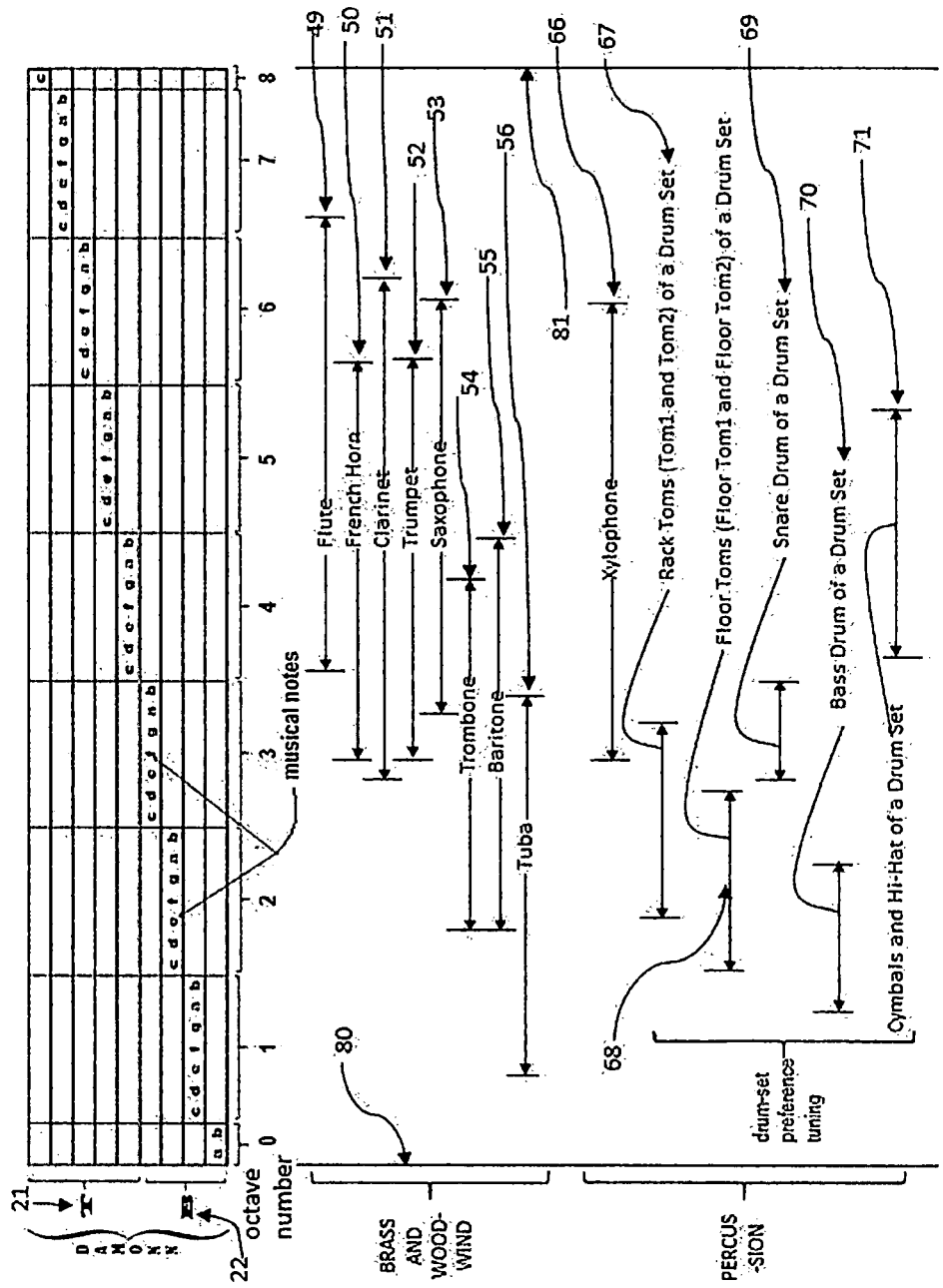
FIG. 7B shows the ranges of music notes of several musical instruments, in the family categories of brass and woodwind, and percussion instruments that can be used with DAMONN music notation system

FIG. 7A and FIG. 7B show the range of music notes that can be used with DAMONN music notation. Since the 88-key piano has the widest range of musical notes, from A0 to C8, the DAMONN music notation can be applied to all other musical instruments in the family categories of keyboard, string, brass and woodwind, and percussion instruments.

In conclusion, any beginner player should intuitively understand the DAMONN music notation and should be capable of reading the DAMONN sheet music quickly without having the note-recognition skills, aural skills, or highly-developed working memory. Fortunately, with the DAMONN music notation invention, any musicians, beginners or experienced musicians, can read directly and visually these 12 piano-key names right off the Treble staff and Bass staff instantly without having to do any mental transformation tasks any more. And lastly, the DAMONN music notation may be able to provide musicians the new capability, 'What you see on DAMONN sheet music is actually what you play your musical instrument,' for years to come.

We claim:

1. A musical music notation system which is a method of writing music into paper and/or digital sheet music or music scores), a method of reading music from paper and/or digital sheet music, a method of playing one of musical instruments with respect to reading of paper and/or digital sheet music, and a simple and efficient method of teaching or learning music education with this present music notation system that includes additional teaching aids, and the likes; this present music notation comprises of:
   a) 4 to 11 staff-lines depicted on a substrate, the number of staff-lines, provided as needed, the staves comprising horizontal lines demarcated by vertical lines into musical measures, the staff-lines including a top line;
   b) musical note symbols denoted by the alphabetical letters representing notes, according to the following note range: c, c #, d, d #, e, f, f #, g, g #, a, a #, b, where the accidental notes include symbols indicating sharp or flat, where the note symbols are placed in the space between the staff-line and the next line above it;
   c) indicia at the beginning of each staff-line with an octave indicia, where the indicia, per line includes the where the bass-note area staves are octave numbers 0 to 3 and the treble-note area staves include octave numbers 4 to 8 and music note range is repeated per octave;
   d) two sets of vertically spaced apart staves, lines providing indicia to indicate whether the set of lines is considered the treble music area or the bass music area: where the bass and treble music areas have an indicia that indicate the where the bass area ends and the treble area ends;

e) a staff indicia to indicate whether the staff is the bass note area or the treble note area, where the bass note area indicia is a B and the treble note area is a T; and f) an area to the left of the first musical measure with indicia for indicating the musical key, the tempo which shows the number of beats per minute, and the time signature.

2. The music notation system of claim 1 further including:

a) a space between the treble staff and the bass staff without staff-lines;

b) staff-spaces below the bottom staff-line of the treble staff to add more treble notes to put those additional notes on the treble staff;

c) staff-spaces above the top staff-line of the bass staff to add more bass notes;

d) the placement of lyrics in the space between the staves for the bass staff and the treble staff; and e) the staff-lines provide a space for notating the 88 music pitches that are produced by musical instruments.

3. The music notation system of claim 1 further including:

a) 12 or more music chord symbols of the treble staff comprising of the following chord symbols: C, C #, D, D #, E, F, F #, G, G #, A, A #, B designating in upper-case alphabets and accidental symbols; these said chord symbols are shown above the top staff-line of the treble staff in order to indicate the musical chords for the treble notes, wherein these chords includes chord variations, i.e. major chords, minor chords, diminished chords, and augmented chords; and b) 12 or more music chord symbols of the bass staff comprising of the following chord symbols: C, C #, D, D #, E, F, F #, G, G #, A, A #, B designating in upper-case alphabets and accidental symbols; these said chord symbols are shown below the bottom staff-line of the bass staff in order to indicate the music chords for the bass notes, wherein these chords including chord variations, i.e. major chords, minor chords, diminished chords, and augmented chords.

4. The music notation system of claim 1 further including note duration symbols according to a division of the time signature which comprises:

a) a quarter note symbol in the form of a stem without a flag linked to the alphabetical-letter note to show the note value duration per beat of the time signature; the quarter note symbol linked to each of the 12 musical notes and representing a beat in the time signature; the quarter note can be designated without a stem nor flag in an alternate form;

b) an eighth note comprising a stem and a flag linked to one of 12 music notes;

c) a sixteenth note comprising a stem and two flags designated as one of 12 music notes;

d) a thirty-second comprising a stem and three flags linked to one of 12 music notes;

e) a sixty-fourth note comprising a stem and four flags linked to one of 12 music notes;

f) notes of duration longer than a quarter note, are assigned a semi note followed by >2 symbol which means 'two times of a quarter note duration';

g) in a similar manner, a whole note can be assigned as a music note followed by >4 symbol which means 'four times of a quarter note duration';

h) in a similar manner for other longer note duration; in addition, a quarter note with a dot has its note duration equals to a quarter note duration plus an eighth note duration; and i) a dot used to designate the note duration of one-and-one-half times, where a quarter note, with a dot, becomes three-eighth notes duration.

5. The music notation system of claim 1 further including note duration symbols according to a division of the time signature which comprises:

a) an eighth note symbol that is assigned as the note value per beat of time signature, where the eighth note can be designated without a stern or flag; the eighth note symbol linked to each of the 12 musical notes;

b) a sixteenth note duration symbol comprising a stem and two flags;

c) a thirty-second note-duration symbol comprising a stem and three flags;

d) a sixty-fourth note-duration symbol comprising a stem and four flags;

e) a quarter note symbol comprising a music note followed by >2 symbol which means 'two times of an eighth note duration';

f) a half note symbol comprising a music note followed by >4 symbol which means 'four times of an eighth note duration';

g) a whole note symbol comprising a music note followed by >8 symbol which means 'eight times of an eighth note duration';

h) the symbol > and a number is assigned for longer note duration; and i) a dot used to designate the note duration one-and-one-half times, where an eight note, with a dot, becomes three-sixteenth notes.

6. The music notation system of claim 1 further including note duration symbols according to a division of the time signature which comprises:

a) the beat of the time signature is other than the quarter note or eighth note and adjusting the other note duration symbols according to which note duration is designated to be the beat of the time signature.

7. A method of selecting the staff-lines for the range of musical instruments used with the music notation system of claim 1 according to a visual aid, comprising:

a) providing a visual aid comprising:

the musical staff of the notation of claim 1, where the note names are indicated on the staff lines per octave and a listing of instruments with an indicia for range;

a listing of keyboard instruments according to the number of keys and type of instrument of the named instrument;

a listing of string instruments, according to the range of the named instrument;

a listing of brass and woodwind instruments according to the range of the named instrument;

a listing percussion instruments according to the range of the named instrument; and b) the user can find the instrument name they use on the visual aid and determine where the range of notes their instrument uses can be annotated in the new notation, according to claim 1.

8. A method of teaching the music notation system of claim 1 according to a visual aid, comprising:

a) providing a visual aid, comprising:

representing the grand staff with the standard notation notes placed thereon representing the notation system of claim 1, providing the equivalent notation, where there are a series of doted lines through the standard note symbol and new note symbol of the new notation system;

b) the user follows the linking line from the standard notation to the notation system of claim 1; and c) the user uses the visual to translate between the two types of musical notation for reading or writing the new notation.

9. The method of teaching the music notation system of claim 8 wherein to a visual aid, comprising:

representing the 88 keys of a piano and the corresponding note and octave of the note above the two notation systems, wherein a user can correspond the note on the new notation system to the key on the 88-key keyboard.

\* \* \* \* \*